(12) United States Patent
Nobis et al.

(10) Patent No.: US 9,001,189 B2
(45) Date of Patent: Apr. 7, 2015

(54) METHOD AND DEVICE FOR OPTICALLY ALIGNING THE AXELS OF MOTOR VEHICLES

(75) Inventors: Guenter Nobis, Nuertingen (DE); Stefan Schommer, Unterschleissheim (DE); Adriano Macchia, Munich (DE); Christian Wagmann, Munich (DE); Jochen Backes, Munich (DE); Volker Uffenkamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 561 days.

(21) Appl. No.: 13/063,142

(22) PCT Filed: Aug. 26, 2009

(86) PCT No.: PCT/EP2009/060989
§ 371 (c)(1),
(2), (4) Date: May 23, 2011

(87) PCT Pub. No.: WO2010/028949
PCT Pub. Date: Mar. 18, 2010

(65) Prior Publication Data
US 2011/0221867 A1    Sep. 15, 2011

(30) Foreign Application Priority Data
Sep. 12, 2008   (DE) .......................... 10 2008 042 024

(51) Int. Cl.
*H04N 13/02* (2006.01)
*H04N 15/00* (2006.01)
*G01B 11/275* (2006.01)

(52) U.S. Cl.
CPC .......... *G01B 11/275* (2013.01); *G01B 2210/12* (2013.01); *G01B 2210/146* (2013.01); *G01B 2210/30* (2013.01)

(58) Field of Classification Search
CPC ...................... H04N 13/0239; H04N 13/0055
See application file for complete search history.

(56) References Cited

U.S. PATENT DOCUMENTS 5,675,515 A * 10/1997 January .......................... 700/279
5,724,743 A *  3/1998 Jackson ........................... 33/288

(Continued)

FOREIGN PATENT DOCUMENTS

DE     42 12 426      7/1993
DE     197 57 763     7/1999

(Continued)

*Primary Examiner* — Chikaodili E Anyikire
(74) *Attorney, Agent, or Firm* — Kenyon & Kenyon LLP

(57) ABSTRACT

A method and a device are provided for the optical axle alignment of wheels of a motor vehicle. At the wheels that are to be aligned, targets are mounted, having optically recordable marks, the targets being recordable by measuring units that have stereo camera devices. In a referencing process, using a referencing device that is integrated into the measuring units, a measuring position reference system is established for the measuring units. In a calibration process, in which a local 3D coordinate system is established using at least three marks of the target, the determination of a reference plane is carried out, using a significant mark of the target. Finally, using the reference plane, a vehicle longitudinal center plane is ascertained, while taking into account the measuring location reference system. In a subsequent measuring process, an image is recorded of at least three indeterminate marks taken during the calibration process, and their spatial position is ascertained in the local 3D coordinate system by the evaluation unit.

12 Claims, 2 Drawing Sheets

(56) References Cited

U.S. PATENT DOCUMENTS

| | | | |
|---|---|---|---|
| 5,809,658 A * | 9/1998 | Jackson et al. | 33/288 |
| 6,412,183 B1 * | 7/2002 | Uno | 33/203.12 |
| 8,215,023 B2 * | 7/2012 | Stieff et al. | 33/203.18 |
| 2004/0165180 A1 * | 8/2004 | Voeller et al. | 356/139.09 |
| 2007/0124949 A1 * | 6/2007 | Burns et al. | 33/288 |
| 2008/0007722 A1 * | 1/2008 | Golab et al. | 356/139.09 |

FOREIGN PATENT DOCUMENTS

| | | |
|---|---|---|
| DE | 199 34 864 | 2/2001 |
| EP | 1 717 547 | 11/2006 |
| EP | 1 887 317 | 2/2008 |
| JP | 8-292115 | 11/1996 |
| WO | 94/05969 | 3/1994 |

\* cited by examiner

METHOD AND DEVICE FOR OPTICALLY ALIGNING THE AXELS OF MOTOR VEHICLES

FIELD OF THE INVENTION

The present invention relates to a method and a device for the optical aligning of the axles of motor vehicles.

BACKGROUND INFORMATION

Such axle alignment systems have the distinction of a contactless optical aligning of targets mounted on the vehicle wheels. The targets have optically recordable marks which are recorded by picture-taking devices, and the images of the marks are evaluated by an evaluation unit using the means of image processing.

A method and a device having a stereo camera device as the image-taking devices is discussed in DE 42 16 426 C1, in which, outside the axle of a wheel of the motor vehicle, at the end face of the wheel, an optically recordable mark is applied. For the determination of the spatial position of the wheel rotational axis, the wheels are put in rotation, and during the rotational motion, the mark rotating about its axle is recorded by the stereo cameras of the image-taking device in successive images. The spatial position of the axle of the wheel is ascertained by the evaluation unit from the recorded pictures of the mark. During the measuring process, this axle alignment system does not draw upon any local 3D coordinate system for the marks, so that, in order to carry out each new measurement, the wheel that is to be measured, has to be put in rotation anew.

Another axle alignment system having a stereo camera device is discussed in DE 197 57 763 A1. Besides the marks for the wheel of the motor vehicle, a separate reference feature device having reference features is used. Using a separate calibration process on rotating wheels, a local 3D coordinate system and the wheel's rotational axis are ascertained, using the marks on the wheel, for the compensation for the rim runout. For a wheel standing still, the measuring process takes place by recording the marks on the wheel and the reference features of the reference feature device. The recording is evaluated using the evaluation unit, and using known methods of image processing and triangulation.

In these axle alignment systems using stereo camera devices, the measuring units having stereo cameras are in each case situated laterally next to the wheels, so that the field of vision of the cameras is directed, transversely to the vehicle longitudinal center plane, at the optically recordable marks present there or the adaptor affixed to the end face of the wheel as mark carrier, the so-called targets.

In an axle alignment system of WO 94/05969 A1, a mono-camera device is present whose field of vision is directed, in the direction of the vehicle longitudinal center plane, at targets mounted on the wheels, the targets being laterally distant in the space from wheels and extending into the field of vision of the cameras. On the targets, a plurality of marks have been applied which have known geometrical features and relationships that are known to the evaluation unit. During the measuring process, the marks are recorded by the image-recording device, using a single image. By a comparison of the geometry and relationships of the recorded marks to the geometrical features and relationships of the marks known to the evaluation unit, the evaluation unit determines the orientation of the target, and from this the spatial position of the rotational axis of the wheel is ascertained.

SUMMARY OF THE INVENTION

It is an object of the exemplary embodiments and/or exemplary methods of the present invention to create an axle alignment system, having a stereo camera device, which supplies a high accuracy of measuring results, without making greater technical demands on the image-recording device and the evaluation unit. In addition, the axle alignment system should have as small a space requirement in the service shop as possible.

The object of the exemplary embodiments and/or exemplary methods of the present invention is attained by the characterizing features described herein.

The axle alignment system according to the present invention stands out essentially in that, in an alignment process, in which a local 3D coordinate system is determined by at least three marks of the target, a determination is carried out of a reference plane using a significant mark of the target. Furthermore, in a referencing process, using a referencing device integrated into the measuring units, a measuring position reference system is established for the measuring units. Finally, using the reference plane, a vehicle longitudinal center plane is ascertained, while taking into account the measuring location reference system. In a subsequent measuring process, an image is recorded of marks taken during the calibration process, and their spatial position is ascertained in the local 3D coordinate system by the evaluation unit.

The axle alignment system according to the present invention has the advantage that the referencing effort for creating a measuring location reference system is reduced, and the determination of a local 3D coordinate system for the marks of the targets is more accurate and more robust. The measuring process is able to make do with the marks of the targets which are also used for the calibrating process.

Because of the combination of the referencing process for establishing the measuring location reference system and the calibration system for determining the local 3D coordinate system, one may do without putting in a reference feature arrangement during the measuring process. The measuring location reference system is produced by the referencing device integrated into the measuring units. Consequently, because of the elimination of additional reference feature arrangements, fewer manipulations are required for the preparation of the measuring process during referencing. The method thereby becomes easier to handle and quicker to carry out for the service personnel in the workshop.

Because the measuring units are fastened laterally on the travel rails of the lifting platform, the axle alignment system in total requires little space in the service shop, and an additional mechanical height adjustment for measuring the lifted vehicle becomes unnecessary. In addition, because of the three-dimensional measurement of the individual indeterminate marks, the overall concept of the axle alignment system makes possible that the surface of the target, on which the marks are located, does not have to be even, as would be the case in an axle alignment system having a mono-camera arrangement that required predetermined marks on the target. For that reason, the targets are also insensitive with respect to changes by temperature, or changes by mechanical influences that could change the position of the marks with respect to one another.

Advantageous refinements of the exemplary embodiments and/or exemplary methods of the present invention are possible because of the measures further described herein.

It is particularly advantageous if a specified wheel center plane is drawn upon as the reference plane. The wheel center plane is defined by a center plane running through the wheel rim.

Using the reference plane, a vehicle longitudinal center plane may advantageously be ascertained, while taking into account the measuring location reference system. A particularly precise determination of the vehicle longitudinal center plane is achieved when the distance of a significant mark from the wheel center plane established as the reference plane is known to the evaluation unit. In addition, besides the significant mark, at least two indeterminate marks may be drawn upon in the calibration process, for the determination of the local 3D coordinate system and the spatial position of the rotational axis of the wheel.

During the calibration process, the motor vehicle is moved from an initial position to an end position, the targets applied to the wheels being moved at a rotational angle of 50° to 70° about the rotational axis of the wheel. During the rolling of the wheels and the rotational motion of the targets, an image sequence of 20 to 30 images/sec is taken of the indeterminate marks and of the significant mark of the target, in each case. In the calibration process, starting with the joint evaluation of all measurements of an image sequence, and using the at least three marks of the target, of which one is the significant mark, the local 3D coordinate system, the rotational axis of the wheel for the compensation of the rim runout, and the out of true of the target mounting support and the reference plane are determined robustly and reliably according to known compensation measures.

Great accuracy of the axle alignment system is ensured, in particular because the measuring location reference system of the measuring units and the local 3D coordinate system of the marks have to be newly determined before each measurement.

An exemplary embodiment of the present invention is represented in the drawings and explained in greater detail in the following description.

DETAILED DESCRIPTION

Figure 1:
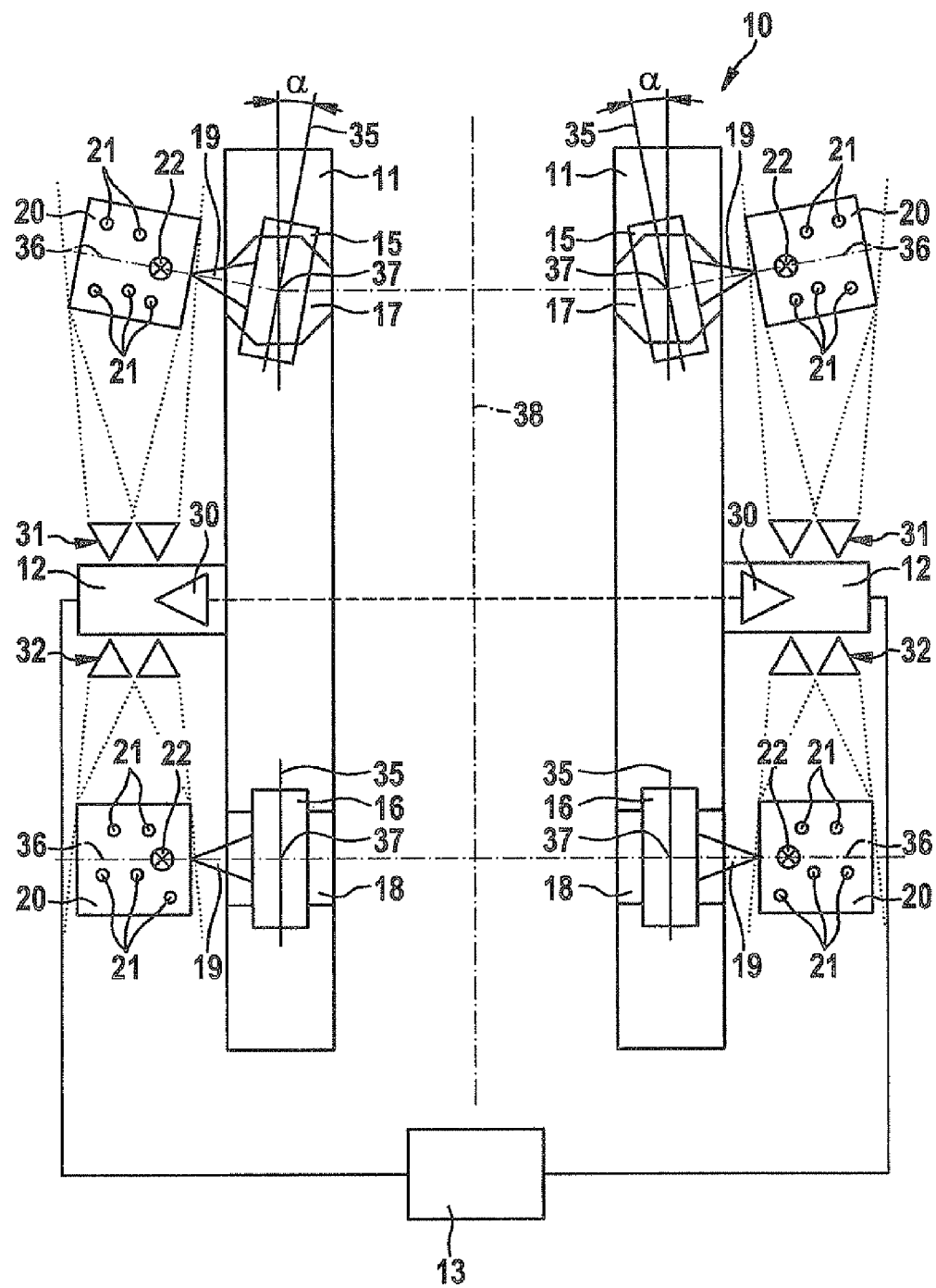
FIG. 1 shows a schematic top view of a measuring location of an axle alignment system.

The axle alignment system shown in a top view in FIG. 1 includes a lifting platform 10 having two travel rails 11, at each of which a measuring unit 12 is fastened laterally, which has image-taking devices. Measuring units 12 are in connection to an evaluation unit 13, which includes image processing software known per se. A vehicle is indicated on travel rails 11, which has two front wheels 15 and two rear wheels 16, having in each case rotational axis of the wheel 36 drawn in. Front wheels 15 stand on rotatably supported mounting plates 17, and rear wheels 16 on axially displaceably supported mounting plates 18. Furthermore, a vehicle longitudinal center plane 38 of the motor vehicle and a wheel center plane 35 of wheels 15, 16 are shown. The intersection of rotational axis of the wheel 36 and wheel center plane 35 forms a wheel rotation center 37. Vehicle longitudinal center plane 38 is ascertained, in this instance, from the middle of the tread width of front wheels 15 and rear wheels 16. The middle of the tread width of an axle is given by the connection of wheel rotation centers 37 of wheels 15, 16 of an axle.

Target mounting supports 19 are mounted at the two front wheels 15 and the two rear wheels 16, at which paddle-shaped targets 20 are fastened, that are laterally at a distance into the space. Targets 20 have an essentially flat surface on which markings are situated that are in each case recordable by the image-taking devices and are optically recordable. A plurality of indeterminate marks 21 are used as optically recordable markings and in each case one significant mark 22. Indeterminate marks 21 have no predetermined position on target 20. Consequently, the position of indeterminate marks 21 is not known to evaluation unit 13. This being the case, the indeterminate marks 21 on the four targets 20 used are able to differ for individual wheels 15, 16.

In the present exemplary embodiment, according to FIG. 2, at all four targets 20, but at least at targets 20 of the same axle, significant mark 22 is at the same distance d from a reference area 27 on target mounting support 19, as will be described in greater detail below, distance d being measured along an axle shaft of target mounting support 19. Distance d of significant mark 22 may be known to evaluation unit 13.

As image-taking devices, the two measuring units 12 each have a first stereo-camera device 31, which each record targets 20 situated at front wheels 15, and each have a second stereo-camera device 32, which each record targets 20 situated at rear wheels 16. Each measuring unit 12 also includes a referencing device 30 having a send/receive unit in each case for the opposite measuring unit 12. Using referencing devices 30 that are integrated into measuring units 12, the direction of measuring units 12 with respect to the earth's gravitational field is determined as reference for the camber as well as the alignment and the distance of measuring units 12 with respect to each other, to determine the toe and the tread width. The referencing process establishes a measuring location reference system for measuring units 12, which is transmitted to evaluation unit 13. Consequently, no additional reference arrangement is required for establishing a measuring location reference system. The axle alignment system is insensitive to changes in the position of measuring units 12 during measuring; referencing of measuring units 12 is possible before and/or continuously during each measuring process. Because no additional mechanical units are necessary for adjusting measuring units 12, no additional space is required in front of, behind or next to lifting platform 10 or the motor vehicle. The referencing of the measuring units makes possible an absolute reference of measuring units 12 with respect to each other, without one's having to apply additional marks on lifting platform 10 or on the motor vehicle.

Figure 2:
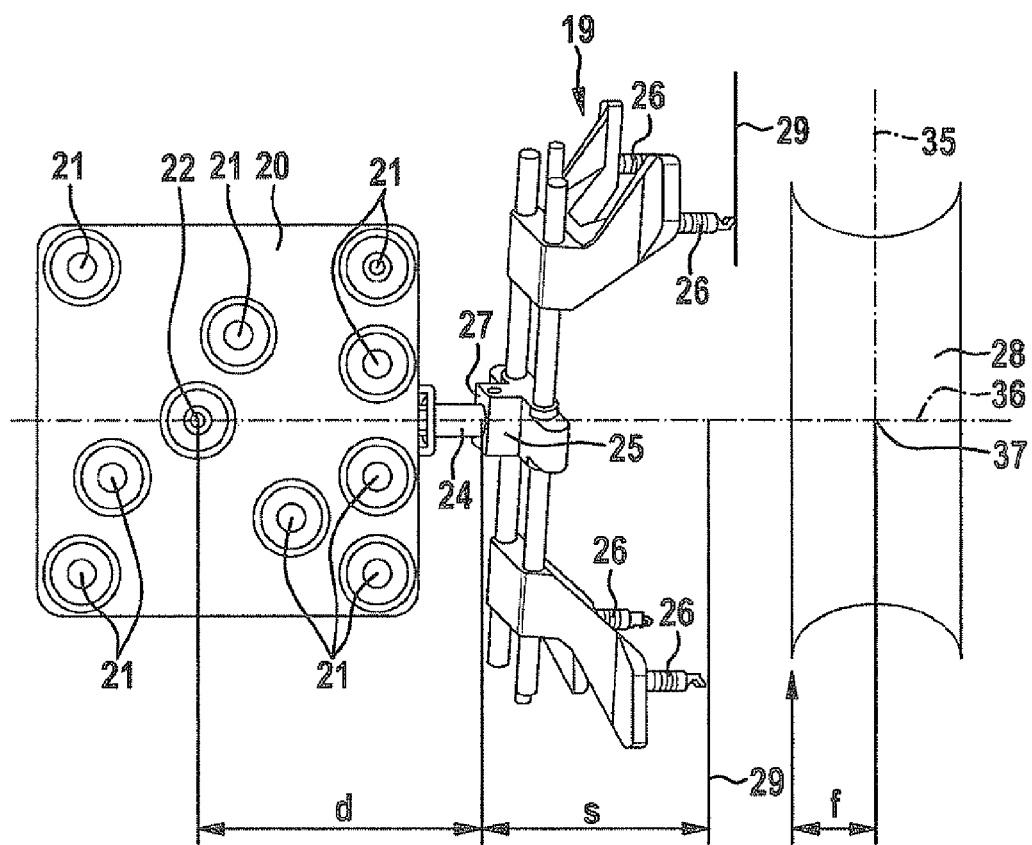
FIG. 2 shows a view of a target having a target mounting support and a schematic representation of a wheel rim.

A more detailed representation of a target 20 may be seen in FIG. 2. Target 20 is fastened by a bolt 24 in a receptacle 25 on target mounting support 19, which are braced using locating pins 26 against a rim flange of an indicated wheel rim 28 of wheels 15, 16. At receptacle 25, target mounting support 19 also has a stop surface for bolt 24 of target 20, which forms reference area 27. In the case of all target mounting supports 19, but at least in the case of target mounting supports 19 of the same axle, the stop for reference area 27 has the same distance s, measured from a contact surface 29 to locating pin 26, by which target mounting support 19 lies against the rim flange of wheel rim 28. Furthermore, a measure f is known between contact surface 29 for locating pins 26 at the rim flange and wheel center plane 35, which is also the same for all wheels 15, 16 of the vehicle. Wheel center plane 35 is stipulated as a plane which runs perpendicular to rotational axis 36 of the wheel 15, 16 and leads through the middle of wheel rim 28. Distance if is specific to the vehicle, and is known to evaluation unit 13. Distance d of significant mark 22 up to reference area 27, and distance s are also known to evaluation unit 13. This yields an overall distance a, known to evaluation unit 13, of significant mark 22 from wheel center plane 35, according to a =d+s+f. Knowledge of distance a is required in order to ascertain the vehicle longitudinal center plane 38 for the vehicle to be aligned in the measuring location reference system, in a calibration process described below.

In performing the axle alignment of a motor vehicle, the motor vehicle is first driven onto travel rail 11 of lifting platform 10, so that wheels 15, 16 are positioned in a first position, approximately in the center of mounting plates 17. In this position, targets 20 are fastened to wheel rims 28 of wheels 15, 16, using target mounting support 19. The position of targets 20 in this position is selected, in this context, in such a way that stereo-camera device's 31, 32 of the two measuring units 12 are able to record marks 21, 22 of respective target 20.

To prepare for the calibration process, the vehicle is rolled back into a second position, which forms the initial position for the calibration process. The calibration process is started by moving the motor vehicle forward again in the direction towards the first position, so that wheels 15, 16 on mounting plates 17, 18 roll off into a third position which represents the end position of the calibration process. For the further measurement, the vehicle is moved approximately back to the first position, so that wheels 15 are then located again approximately in the middle of mounting plates 17.

During the calibration process, because of the motion of the motor vehicle from the initial position to the end position, wheels 15, 16 roll on travel rails 11, for instance, through a rotational angle of 50° to 70°, targets 20 rolling along with wheels 15, 16 by the same amount. During the rolling forward of wheels 15, 16 in the calibration process, an image sequence of at least three images is taken each by respective stereo-camera device 31, 32 of significant mark 22 as well as of at least two indeterminate marks 21. From the image sequence of marks 21, 22, evaluation unit 13 ascertains a local 3D coordinate system, the spatial position of rotational axis of the wheel 36 in the local 3D coordinate system for the compensation for the rim runout and the out of true of target mounting support 19. Moreover, a reference plane is determined in the local 3D coordinate system using significant mark 22. In the present exemplary embodiment, with the aid of known distance a of significant mark 22 from wheel center plane 35, wheel center plane 36 is ascertained as the reference plane. The data are stored in evaluation unit 13 for the subsequent measuring process. On the assumption that, at least at targets 20 of wheels 15, 16 of the same axle, significant mark 22 is at the same distance d from reference area 27, vehicle longitudinal center plane 38 is determined by the evaluation unit, further using the determined reference plane, while taking into account the measuring location reference system ascertained. In this case, distance d of the evaluation unit does not have to be made known. According to the present exemplary embodiment, however, it is regarded as expedient to use known distance a of significant mark 22 from wheel center plane 36, which is made known to the evaluation unit, additionally to draw upon the position of wheel center plane 36 in the local 3D coordinate system as reference plane. While taking into account the previously determined measuring location reference system, vehicle longitudinal center plane 38 is then ascertained with the aid of the determined position of wheel center plane 36.

In the present exemplary embodiment, to increase the accuracy, in the calibration process and in the subsequent measuring process, more than two indeterminate marks 21 are utilized, and in each case 25 to 30 images/sec of each mark 21, 22 are taken by stereo-camera devices 31, 32.

After the calibration process, the motor vehicle, which is located having its wheels 15 in the middle of mounting plates 17, is submitted to the actual measuring process for the axle alignment. To do this, however, mounting plates 17, 18 first have to be unlocked, so that wheels 15, 16 are able to be unstressed from the stressing of the tires acting on wheels 15, 16. Because of that, each wheel 15, 16 takes up the position to which the setpoint values supplied by the manufacturer refer.

Before the measuring process, or continuously during each image taking of the measuring process, the referencing process, already described, for measuring units 12 takes place using referencing device 30, so that the position of measuring units 12 in the measuring location reference system is known to evaluation unit 13. The referencing process is first required for the measuring process, since in the calibration process stereo-camera devices 31, 32 are able to work independently of each other. However, there are exceptions if the evaluation of the image sequence is done, not by the wheel, but by the axle or even on all four wheels in common. In these cases, the referencing process is carried out before the calibration process. In these exceptional cases, the measuring location reference system has to be known during the calibration process.

In the measuring process for determining the axle geometry, such as toe and camber, from each target 20 one take is used of the at least three marks 21, 22 drawn upon during the calibration process. One embodiment is not to use significant mark 22 during the measuring process. However, in this case it is required, during the calibration process, in addition to significant mark 22, to draw upon three indeterminate marks 21 to determine the local 3D coordinate system. In the subsequent measuring process, at least the three same indeterminate marks 21 drawn upon for the calibration process are then taken up. The images, taken of the at least three marks 21, by stereo-camera devices 31, 32 are evaluated by the image-taking device using known means of image processing, and the 3D coordinates of marks 21 are determined using the known method of triangulation. From the ascertained 3D coordinates, and while taking into account the local 3D coordinate system established in the calibration process, evaluation unit 13 calculates the wheel geometry, such as the spatial position of the rotational axis of the wheel 36 while compensating for the rim runout and the out of true of target mounting supports 19.

The calculations also supply the position of wheel center plane 35 in the measuring location reference system, from which one may then determine the vehicle longitudinal center plane 38 as reference for the single toe of the rear wheels.

Finally, the angle α for the toe, and the angle (not shown) for the camber of respective wheel 15, 16, lying perpendicular to the plane of the drawing, are ascertained from the spatial position of rotational axis of the wheel 36.

The is claimed is:

1. A method for providing optical axle alignment of the wheels of a motor vehicle, the method comprising:
using a measuring unit, in a measurement process, to take at least one stereoscopic image of at least three marks of a planar target mounted on a wheel, wherein a plane defined by the planar target is perpendicular to a plane defined by a side wall of the wheel;
ascertaining, using an evaluation unit, a spatial position of a rotational axis of the wheel in a previously determined local 3D coordinate system using image processing, and in which, in a referencing process, a measuring location reference system is established for the measuring unit, a calibration process being carried out before the measuring process, in which the targets rotate about the rotational axis of the wheel, and in the calibration process, using at least three marks of the target, the local 3D coordinate system is established and the spatial position of the rotational axis of the wheel is ascertained; and during a subsequent measuring process, while the wheel is standing still and the target is unmoved, the spatial position of at least the at least three marks of the target drawn upon during the calibration process is ascertained, in the local 3D coordinate system, wherein, during the calibration process, a determination of a reference plane is carried out using a significant mark of the target, the significant mark on the targets of the wheels of the same axle having an identical distance from a common reference area.

2. The method of claim 1, wherein, using the reference plane, a vehicle longitudinal center plane is ascertained, while taking into account the measuring location reference system.

3. The method of claim 1, wherein a wheel center plane is drawn upon as reference plane, and wherein the significant mark is at a distance (a), known to the evaluation unit, from the wheel center plane.

4. The method of claim 1, wherein during the calibration process the motor vehicle is moved from an initial position to an end position, the targets mounted on the wheels being moved through a rotational angle of 50° to 70° about the rotational axis of the wheel.

5. The method of claim 1, wherein during the rolling off of the wheels an image sequence of 20 to 30 images/sec is taken respectively of the indeterminate marks and of the significant mark of the target.

6. The method of claim 1, wherein the referencing process takes place before the measuring process or continuously during each image-taking of the measuring process.

7. The method of claim 1, wherein the referencing process takes place before the calibration process.

8. A device for providing optical axle alignment of the wheels of a motor vehicle, comprising:

planar targets mounted on the wheels that are to be aligned, which are furnished with optically recordable marks, wherein a plane defined by each respective planar target is perpendicular to a plane defined by a side wall of the corresponding wheel;

measuring units, which have at least one stereo camera device as the image taking device for recording the marks, in a measuring process of at least three marks of the target, at least one stereoscopic image being taken, and from this, the spatial position of the rotational axis of the wheel is ascertained by an evaluation unit, in a local 3D coordinate system, using image processing, wherein the measuring units, besides the stereo camera devices, include a referencing device, by which the position of the measuring units in a measuring location reference system is able to be determined, and wherein on the target, in addition to at least two indeterminate marks, an additional significant mark is positioned which, at least at the targets of the wheels of the same axle, is at an equal distance (d) from a common reference area, and wherein the evaluation unit is configured to determine a reference plane using the significant mark of the target.

9. The device of claim 8, wherein the distance (d) of the significant mark from the reference area is known to the evaluation unit.

10. The device of claim 8, wherein a distance (a) of the significant mark from a wheel center plane is known to the evaluation unit, the wheel center plane being used as the reference plane.

11. The device of claim 10, wherein the distance (a) is made up of the known distance (d) of the significant mark from the reference area, a known distance (s) of the reference area from a spanning plane on a target mounting support and a known distance of the spanning plane from the wheel center plane.

12. The device of claim 8, wherein the measuring units are situated laterally on the travel rails, in such a way that the field of vision of the respective stereo camera device records the marks of the respective target.

* * * * *